United States Patent [19]

Arya et al.

[11] Patent Number: 5,710,682
[45] Date of Patent: Jan. 20, 1998

[54] ELECTROSTATIC DISCHARGE PROTECTION SYSTEM FOR MR HEADS

[75] Inventors: Satya P. Arya, San Jose; Timothy Scott Hughbanks, Morgan Hill, both of Calif.; Steven Howard Voldman, South Burlington, Vt.; Albert John Wallash, Morgan Hill, Calif.

[73] Assignee: International Business Machines Corporation, Armonk, N.Y.

[21] Appl. No.: 799,259

[22] Filed: Feb. 13, 1997

Related U.S. Application Data

[63] Continuation of Ser. No. 706,107, Aug. 30, 1996, abandoned, which is a continuation of Ser. No. 613,928, Mar. 11, 1996, Pat. No. 5,644,454.

[51] Int. Cl.$^6$ .............................. G11B 5/48; G11B 21/16
[52] U.S. Cl. .............................. 360/106; 360/113
[58] Field of Search .............................. 360/104, 106, 360/107, 109, 113; 29/603.04, 603.07

[56] References Cited

U.S. PATENT DOCUMENTS

| | | | |
|---|---|---|---|
| 4,800,454 | 1/1989 | Schwarz et al. | 360/123 |
| 5,247,413 | 9/1993 | Shibata et al. | 360/113 |
| 5,270,882 | 12/1993 | Jove et al. | 360/67 |
| 5,272,582 | 12/1993 | Shibata et al. | 360/113 |
| 5,465,186 | 11/1995 | Bajorek et al. | 360/113 |
| 5,491,597 | 2/1996 | Bennin et al. | 360/105 |
| 5,491,605 | 2/1996 | Hughbanks et al. | 360/113 |
| 5,508,857 | 4/1996 | Horita | 360/105 |
| 5,526,206 | 6/1996 | Shimizu | 360/105 |

FOREIGN PATENT DOCUMENTS

| | | |
|---|---|---|
| 0 556 891 A1 | 8/1993 | European Pat. Off. |
| 6-162447 | 6/1994 | Japan. |

OTHER PUBLICATIONS

IBM Tech. Disclosure Bul., Greaves et al, "Electro Static Discharge Protection....", vol. 36, No. 12, Dec. 1993, pp. 271–272.

*Primary Examiner*—Stuart S. Levy
*Assistant Examiner*—David L. Ometz
*Attorney, Agent, or Firm*—Baker, Maxham, Jester & Meador

[57] ABSTRACT

An MR head receives ESD protection from a mechanism that automatically and releasably shorts the MR head whenever a suspension assembly on which the head is mounted is not installed in an HDA. The suspension assembly includes a flexure underlying a load beam, which is connected to an actuator arm. The MR head is mounted to a distal end of the flexure, leads from components of the MR head being brought out in the form of MR wire leads running along the load beam and the support arm to a nearby terminal connecting side tab. The conductors are separated and exposed at a designated point along the flexure to provide a contact region. A shorting bar, which comprises an electrically conductive member attached to the actuator arm, automatically connects the MR wire leads at the contact region when absence of support for the MR head permits the load beam to bend sufficiently toward the shorting bar. Thus, when the assembly is removed from installation in an HDA, the flexure is permitted to move toward the shorting bar, bringing the contact region and the shorting bar in electrical contact to short the MR wired leads and thereby disable the MR sensor. When the assembly is installed in an HDA, the MR head is supported by an air bearing or the disk itself, depending upon whether the disk is rotating or stopped, respectively. In either case, the load beam is not permitted to droop and the shorting bar cannot contact the conductors, thus activating the MR sensor. Temporary ESD protection mechanisms are also provided, these being removable prior to operation of the HDA by breaking and removing various temporary shorting mechanisms.

16 Claims, 4 Drawing Sheets

ELECTROSTATIC DISCHARGE PROTECTION SYSTEM FOR MR HEADS

This application is a continuation of application No. 08/706,107, filed Aug. 30, 1996, now abandoned, which is a continuation of application No. 08/613,928 filed Mar. 11, 1996, now U.S. Pat. No. 5,644,454.

BACKGROUND OF THE INVENTION

1. Field of the Invention

The present invention relates to the protection of magnetoresistive ("MR") recording heads from damage caused by electrostatic discharge ("ESD"). More particularly, the invention concerns a method and apparatus for providing ESD protection by shorting MR heads during selected times.

2. Description of the Related Art

Many modern disk drives employ MR recording heads, also called "MR heads", "MR sensors", or "MR elements". MR heads provide improved performance in a number of important respects. However, compared to previous generation thin-film recording heads, MR heads are typically about 100 times more sensitive to damage caused by ESD. Some tests have estimated 14,000 volts as the failure voltage for one model of IBM's thin-film inductive recording head. This estimation was made using the known Human Body Model of failure analysis, known as "HBM". In contrast, tests of conventional MR heads indicate an HBM failure voltage of only 150 volts. These tests simply reflect one known characteristic of MR heads—their high susceptibility to damage from ESD.

During operation of a magnetic storage drive, ESD is typically a relatively insignificant problem. The storage drive is usually encased within a computer, where it is protected from static discharge, particle contaminants, human interference, and other damage. In contrast, during the manufacture of magnetic storage drives, ESD can be a significant and perplexing problem, significantly reducing the effective yield of manufacturing operations.

As a result, engineers are continually seeking effective ways to prevent ESD damage during manufacturing operations. Traditionally, one of the best ways to reduce yield losses from ESD damage is to short the leads of an MR head together. This provides an electrical discharge path around the MR element, rather than through it. Experiments conducted by the inventors using a conventional MR head have shown that spanning the MR sensor with a 1 ohm connection increases the HBM failure voltage from 150 to 2000 volts.

Although the MR sensor is protected from ESD when its leads are shorted, this effectively renders the MR sensor inoperative. Therefore, to activate the MR sensor for manufacturing tests and the like, the shorted leads must be removed, disabled, or otherwise electrically disconnected. Likewise, after such tests, the interconnection between the leads must be reconnected to protect the MR sensor again. Manually shorting the leads in this manner, however, fails to provide a sufficiently convenient mechanism for protecting the MR head.

SUMMARY OF THE INVENTION

Broadly, the present invention provides ESD protection for an MR recording head by selectively activating a mechanism that shorts and consequently disables the MR head. The invention includes both method and apparatus aspects. According to the apparatus aspect of the invention, an MR head is provided on a slider mounted to an integrated suspension assembly. The suspension assembly includes a flexure underlying a load beam, the load beam being connected to an actuator arm. The MR sensor leads are brought out in MR lead wires running along the load beam and the actuator arm to nearby terminal connecting side tabs. The MR lead wires are separated and exposed along the load beam to provide a contact region designed for repeatable electrical contact with a rigid shorting bar, which may be embodied in an electrically conductive member attached to the actuator arm.

The shorting bar and contact region MR lead wires are configured such that the shorting bar automatically interconnects the wires at the contact region when lack of support for the MR head permits the load beam to bend toward the shorting bar. As a result, when the suspension assembly is removed from its head disk assembly ("HDA"), the load beam bends toward the shorting bar, bringing the contact region in electrical contact with the shorting bar to short the MR lead wires and thereby disable the MR sensor. When the suspension assembly has been installed into a disk drive, the MR head is supported by an air bearing (when the disk is rotating) or by the disk itself (when the disk is stopped). In either case, the load beam is not permitted to droop and the shorting bar cannot touch the MR lead wires; as a result, activating the MR sensor is activated.

In another embodiment, where the shorting bar is electrically grounded, the MR sensor is grounded whenever the shorting bar meets the MR lead wires.

In a different embodiment, a one-time temporary shorting mechanism is provided to protect the MR head. Here, the MR lead wires are brought out to the terminal connecting side tabs and stripped of insulation in this region. Each MR head wire is adhered at this point to the side tab. A conductive finger overlies the uninsulated MR lead wires at this region, shorting the wires together. After installation of the integrated suspension assembly, the conductive finger and side tab are broken off of the support arm, and the MR lead wires are connected to a disk controller or another electronic module via a ribbon cable or another appropriate means.

In another embodiment, a one-time temporary shorting mechanism is provided to protect the MR head. Here, the MR lead wires are brought out to an electrically conductive side tab and stripped of insulation in this region Uninsulated portions of each MR head wire are adhered to the side tab at this point using conductive adhesive, thereby shorting all MR lead wires together. The conductive side tab may be grounded, if desired. After installation of the integrated suspension assembly, the side tab is separated from the support arm and the MR lead wires, and the wires are connected to a disk controller or another electronic module via a ribbon cable, flex cable, or another suitable means.

In contrast to the apparatus aspect of the invention, a different aspect of the invention concerns a method for automatically activating and deactivating an MR recording head by selectively shorting its leads to protect the head from ESD-induced damage.

The present invention provides a number of distinct advantages. For example, the invention provides a simple and inexpensive method and apparatus for protecting an MR sensor from ESD. Also, the invention is beneficial since it may be implemented to provide ESD protection that is automatically activated when needed.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the present invention provides ESD protection for an MR recording head by shorting and consequently disabling the MR head. The invention includes an apparatus aspect, including one variation in which the mechanism for temporarily shorting the MR head is discarded prior operation of the MR head, and another embodiment in which the MR head is automatically activated in accordance with the position of the suspension assembly. The invention also includes a method aspect, including steps for protecting an MR recording head from ESD.

AUTOMATIC SHORTING MECHANISM

General Construction: Suspension Assembly

Figure 1:
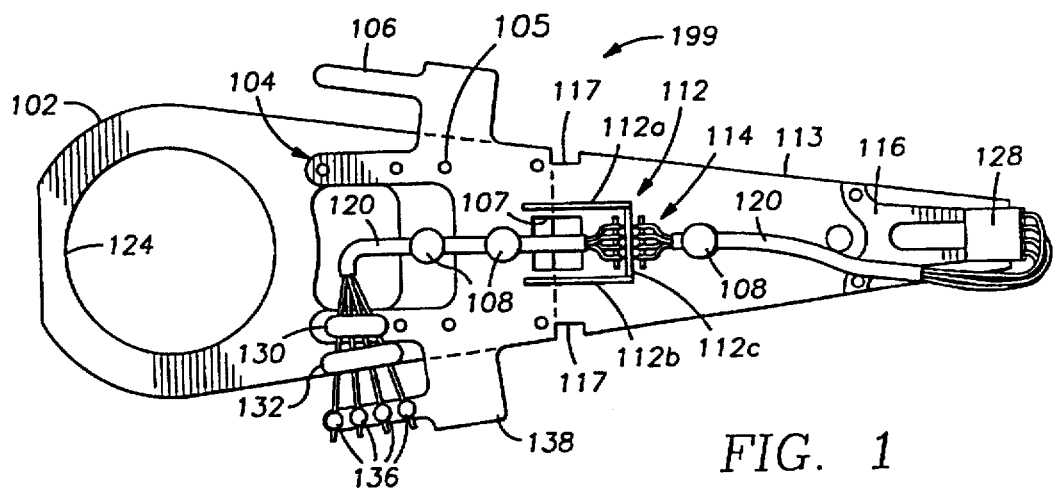
FIG. 1 is a top view of an integrated suspension assembly, pursuant to the invention.
Figure 2:
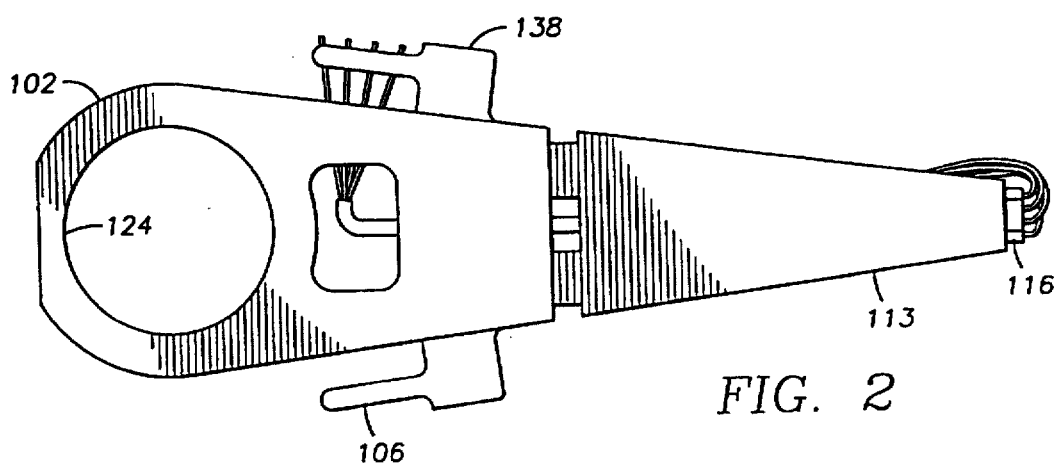
FIG. 2 is a bottom view of the integrated suspension assembly, pursuant to the invention.
Figure 3:
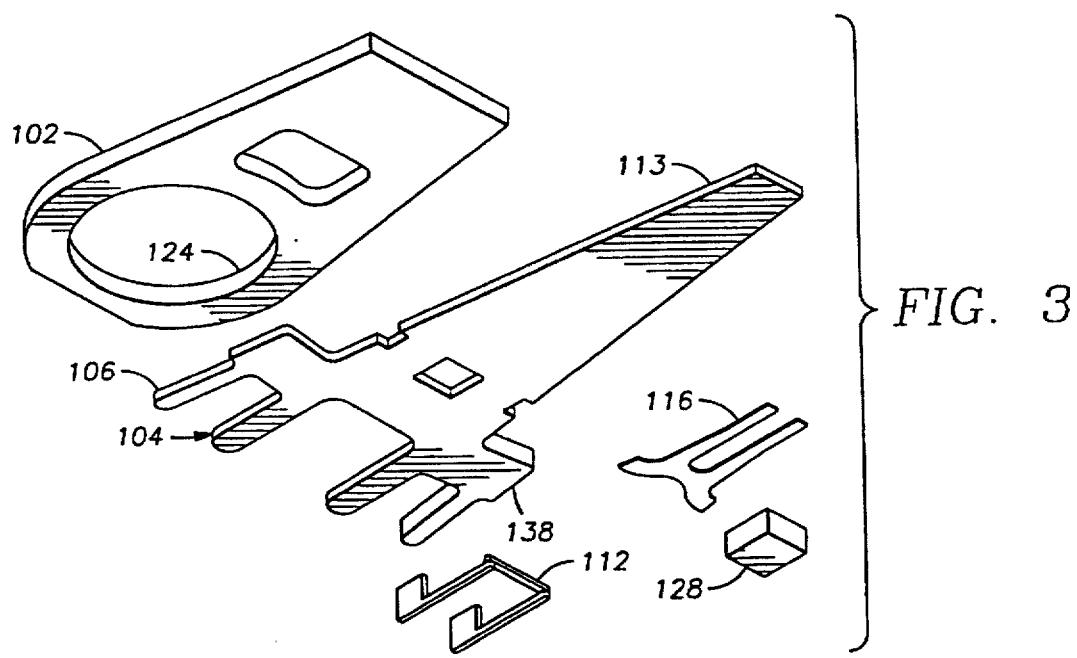
FIG. 3 is an exploded side view of the integrated suspension assembly, pursuant to the invention, with the load beam in its unloaded position.

FIGS. 1-3 depict the hardware components and interconnections of one embodiment of the invention, from top, bottom, and side perspectives, respectively. More particularly, FIGS. 1-3 depict an integrated suspension assembly 199, which is one of many components in a magnetic data storage drive (not shown) such as a "hard drive." The assembly 199 defines a hole 124 that closely fits around an actuator bearing cartridge or another appropriate HDA component to mount the assembly 199 within the data storage drive.

The primary components of the assembly 199 include an MR head 128, a load beam 113, a flexure 116, and an actuator arm 102. When used herein, the term "MR head" denotes an integrated unit that includes an inductive write element and an MR read element. However, this does not exclude application of the invention to a read head that includes only an MR read element. Furthermore, the ESD protection features of the invention may be applied to other types of recording heads such as non-MR heads. The MR head 128 is mounted to the flexure 116. The flexure 116 extends largely coincident with the load beam 113. The load beam 113 includes an extension 104 for connecting it to the arm 102. The extension 104, for example, may be connected to the arm 102 by a number of welding points, e.g. 105. The load beam 113 includes a flexible hinge 117, which permits the distal tip of the load beam 113 to freely move in two directions as the load beam 113 bends about the hinge 107 with respect to the arm 102. The flexible hinge 117 preferably comprises a region of the load beam 113 that has been selectively narrowed to provide the load beam 113 with a desired level of flexibility relative to the arm 102. To further reduce the rigidity of the hinge 117, the load beam 113 may define an open area 107.

Figure 9:
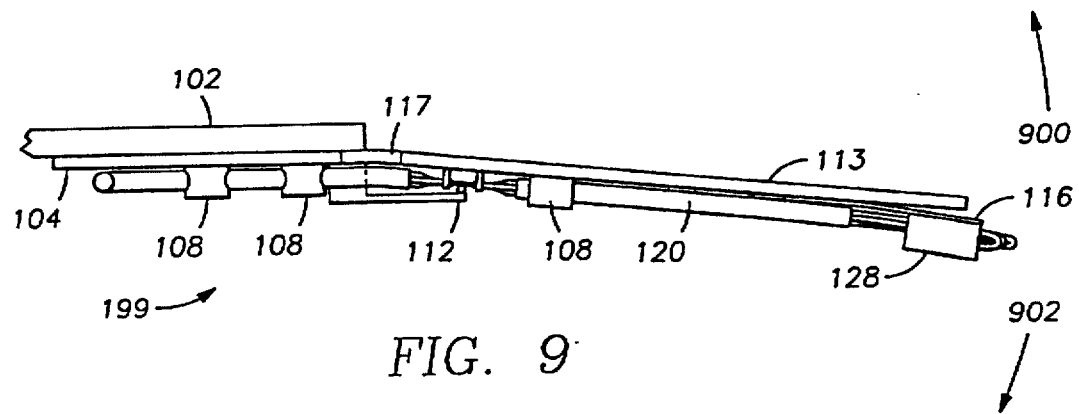
FIG. 9 is a side view of the integrated suspension assembly, pursuant to the invention, with the load beam in its unloaded position.

As shown in FIG. 3, hinge 117 permits the distal tip of the load beam 113 to move "downward" (direction 902, FIG. 9) and back "upward" again (direction 900, FIG. 9). Thus, as described in greater detail below, during operation of the suspension assembly 199 the hinge 117 permits the MR head 128 to closely track the surface of a magnetic recording disk above a thin air bearing, despite any ridges, valleys, or other imperfections in the disk surface.

In addition to the hinged load beam 113, the flexure 116 also helps the MR head 128 to closely track surfaces of magnetic recording disks. In particular, the flexure 116 preferably comprises a very thin layer of metal that generally extends coincident to the load beam 113. The flexure 116 may be about 1 mil thick, for example. Since the flexure 116 is only attached to the load beam 113 at its base, the distal tip of the flexure 116 can fluctuate with respect to the distal tip of the load beam 113. Hence, the flexure 116 helps the MR head 128 to closely track the recording disk, despite variations in the disk surface that might exceed the ability of the hinge 117 to allow sufficient movement of the load beam 113 in the downward 902 and upward 900 directions.

The assembly 199 further includes multiple MR lead wires 120 that electrically connect the MR head 128 to various circuits that assist the MR head 128 in reading and writing data from/to magnetic recording media. These circuits may include, for example, channel electronics, located apart from the assembly 199. The MR lead wires 120 preferably comprise copper wires, the assembly of which is referred to as a "wire harness" or "wire assembly". The MR lead wires 120 may be held together by a tubular sheath (as illustrated), configured in a wire "bundle", or arranged in another suitable manner.

The MR lead wires 120 are connected to various components of the MR head 128. Preferably, the wires 120 are electrically connected to relatively large conductive pads (not shown) on the MR head. Such pads typically are electrically connected to small MR head components, such as: (1) the MR head's inductive write coil, (2) the MR read stripe, and (3) shields, poles, and other elements with electrical connections external to the MR head. The wires 120 run from the MR head 128, along the flexure 116 and load beam 113, across a portion of the arm 102, and thereafter to off-assembly components via another interconnect such as a ribbon cable (not shown). The wires 120 may be affixed to the load beam 113 and the arm 102 by a series of anchors 108. The wires 120 ultimately extend to a terminal connecting side tab 138, where adhesive dots 136 anchor the wires 120 to the side tab 138 with predetermined spacing between the wires. The dots 136 may comprise epoxy, glue, micro-thin ties, or another suitable adhesive device, for example. At the dots 136, the wires 120 are preferably spaced for alignment with an interconnect (not shown) such as a ribbon cable, flex cable, etc. Spacing of the wires may additionally be maintained at other points by adhesive dots 130, 132, or other suitable spacing devices. The assembly 199 may also include a reciprocal side tab 106, for applications in which the wires must exit the assembly 199 in the opposite direction.

Shorting Mechanism

In accordance with the automatic shorting embodiment of the invention, the assembly 199 also includes various features to automatically protect the MR head 128 from ESD damage by selectively shorting components of the MR head 128. In this embodiment, the MR lead wires 120 provide a contact region 114, at which electrical contact with the wires 120 is possible. Preferably, the contact region 114 comprises an area where each wire 120 has no insulation, and all wires 120 are spaced apart to permit individual electrical contact in the manner discussed below. Alternatively, the contact region 114 may comprise a region of planar conductive traces, of the type used in planar trace suspension assemblies. In applications where it is desirable to avoid shorting certain components of the head 128, the wires 120 coupled to these components may simply be provided with insulation at the contact region 114, or routed around the region 114.

A conductive shorting bar 112 is provided to electrically short the wires 120 of the contact region 114 at certain times. At these times the shorting bar 112 engages the MR lead wires 120 of the contact region 114 to electrically short the wires 120 together. This prevents any transient voltages from developing across components of the MR head 128 that are attached to the MR lead wires exposed at the contact region 114. These components may include, for example, the MR stripe, shields, poles, conductive coils, and other components for which ESD protection is desired. The shorting bar 112 preferably comprises an electrically conductive material, such as stainless steel, copper, or brass. From the standpoint of contamination, stainless steel is particularly appropriate for use with HDAs because it gives off few contaminant particles.

The shorting bar 112 is mounted to a portion of the assembly 199 that does not move with fluctuation of the flexure 116 and load beam 113. For example, the bar 112 may be mounted to the extension 104 or to the arm 102. As shown most clearly in FIG. 1, the bar 112 may comprise a "U" shape, with legs 112a–112b that are affixed to the extension 104 and interconnected by a contact member 112c. The contact member 112c and the contact region 114 meet and electrically connect when the load beam 113 bends sufficiently toward the contact member 112c about the hinge 117, i.e. when the MR head 128 moves a sufficient distance in the downward direction 902 (FIG. 9).

Figure 4:
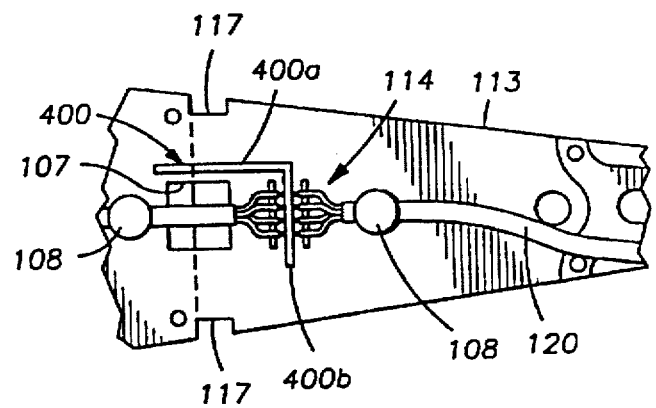
FIG. 4 is a magnified view of a first alternative embodiment of the shorting bar and contact region, pursuant to the invention.

In addition to the example illustrated in FIGS. 1–3, the shorting bar 112 may be implemented in a number of other ways. One example is the "L" shaped contact bar 400, depicted in FIG. 4. This bar 400 includes a leg 400a and a contact member 400b. The leg 400a is preferably adhered to the extension 104 or another suitable stationary support by welding, glue, or another appropriate adhesive device. The contact member 400b is positioned to meet the contact region 114 when the load beam 113 bends sufficiently downward 902.

Figure 5:
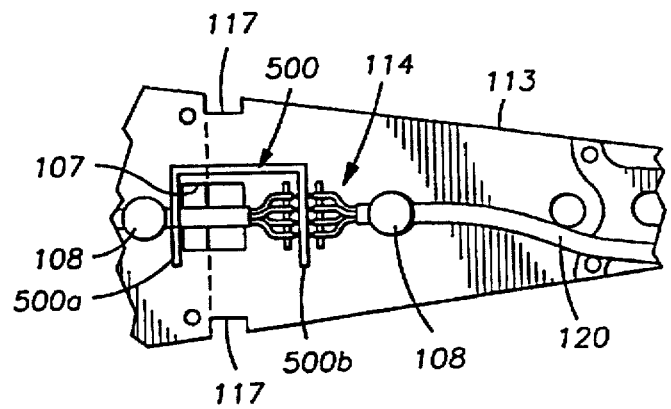
FIG. 5 is a magnified view of a second alternative embodiment of the shorting bar and contact region, pursuant to the invention.

FIG. 5 illustrates another example, where a shorting bar 500 comprises a "U" shaped member. Although similar in shape to the bar 112, the bar 500 is mounted differently. The bar 500 includes legs 500a–500b, where the leg 500a is affixed to the extension 104 or another suitable stationary support by welding, glue, or another appropriate adhesive device. The leg 500b is positioned to meet the contact region 114 when the load beam 113 moves in its downward direction 902. One advantage of this embodiment is that the bar 500 can be mounted to the extension 104 at any desired angle about the leg 500a. Hence, the bar 500 may be mounted to establish greater or lesser travel distances for the flexure 116 to bring the contact region 114 against the leg 500b.

Figure 6:
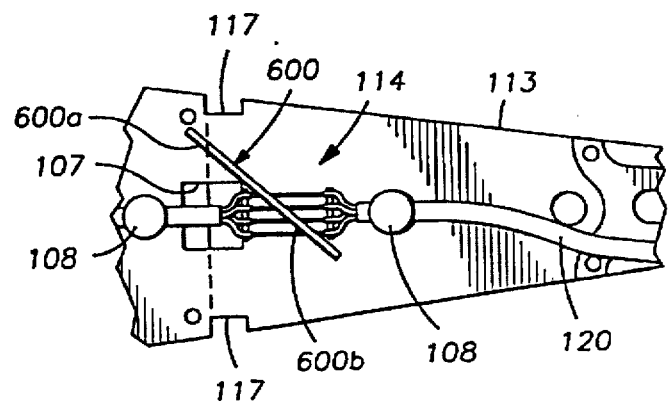
FIG. 6 is a magnified view of a third alternative embodiment of the shorting bar and contact region, pursuant to the invention.

Another example of shorting bar appears in FIG. 6, where a shorting bar 600 comprises a straight member mounted to the extension 104 at an angle. The bar 600 includes a base region 600a having one or more points adhered to the extension 104 or another suitable stationary support by welding, glue, or another appropriate adhesive device. The bar 600 also includes a contact portion 600b positioned to meet the region 114 when the load beam 113 moves sufficiently in its downward direction 300.

Figure 7:
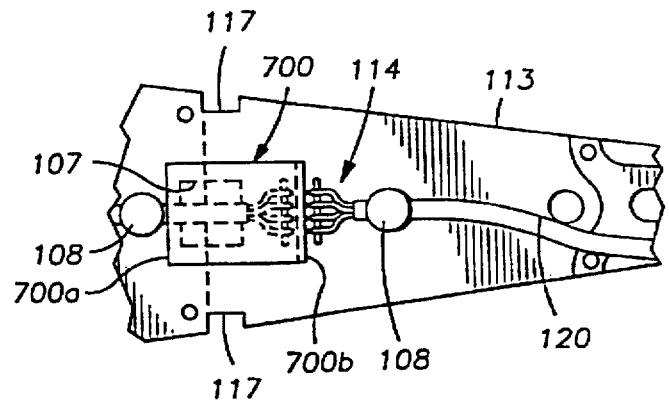
FIG. 7 is a magnified view of a fourth alternative embodiment of the shorting bar and contact region, pursuant to the invention.

FIG. 7 illustrates still another example of shorting bar contemplated by the invention. Specifically, the shorting bar 700 comprises a solid member, having an inner edge 700a adhered to the extension 104 or another suitable stationary support by welding, glue, or another appropriate adhesive device. The bar 700 also includes an outer edge 700b positioned to meet the region 114 when the load beam 113 moves in its downward direction 902. The solid contact bar 700 may also assume the shape of another solid polyhedron, a circle, a frame-shaped polyhedron with a cutout center, or another suitable configuration.

If desired, the shorting bars 112, 400, 500, 600, and 700 may be electrically grounded so that they ground the MR lead wires 120 upon contact in addition to shorting the wires 120 together. In the case of the bar 112 (FIG. 1), for example, when the load beam 113 moves sufficiently downward for the contact member 112c to meet the contact region 114, an electrically grounded shorting bar 112 would ground the wires 120 in addition to shorting them together.

Operation

In contrast to the various hardware components and interconnections that constitute the automatic shorting apparatus aspect of the present invention, a different aspect concerns a method for automatically protecting an MR head from ESD damage. The following description, which references FIGS. 8–9, exemplifies the operation of the integrated suspension assembly 199 with an automatic shorting mechanism as described above. For simplicity of illustration, FIGS. 8–9 omit the actuator bearing cartridge and other components of the HDA to which the assembly 199 is mounted.

Figure 8:
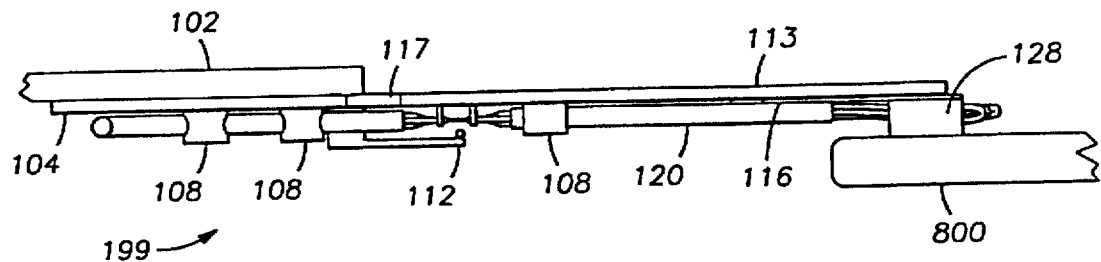
FIG. 8 is a side view of the integrated suspension assembly, pursuant to the invention, with the load beam in its loaded position.

FIG. 8 depicts the assembly 199 in its "loaded position". The assembly 199 is said to be "loaded" because the MR head 128 is supported, directly or indirectly, by a magnetic recording disk 800. The MR head is loaded, for example, when it "flies" above a thin air bearing on the surface of a rapidly spinning disk 800. Similarly, the MR head is loaded when it directly rests upon a disk 800 that is stationary, and thus has no air bearing. In the loaded position, not only is the MR head 128 supported, but the flexure 116 and the load beam 113 are also supported. Downward movement of the load beam 113 about the hinge 117 is therefore limited. In fact, this prevents the load beam 113 from drooping low enough to bring the contact region 114 into physical contact with the shorting bar 112. Therefore, the MR lead wires 120 are not shorted out and the MR head 128 is fully operational.

In contrast, the MR head 128 is not operational when the assembly 199 translates to its "unloaded position" (FIG. 9).

In FIG. 9, the assembly 199 is said to be "unloaded" because the MR head 128 is unsupported. This condition may occur in a number of situations, such as: (1) during manufacturing of the HDA, prior to installation of the assembly 199, (2) after removal of the assembly 119 from the HDA during repair, pre/post-assembly quality testing, or maintenance, (3) during times when the disk 800 is removed from the storage drive, or (4) various other situations.

When the MR head 128 is unloaded due to removal of the assembly 199 or the disk 800 from the HDA, the sensitive components of the MR head 128 are automatically shorted and hence protected. Removal of support for the MR head 128 permits the load beam 113 to droop by bending about the hinge 117. This drooping of the load beam 113 brings the MR lead wires 120 of the contact region 114 into contact with the shorting bar 112, which does no droop since it is rigidly mounted to the arm 102. When electrical connection is made between the contact region 114 and the bar 112, the wires 120 are shorted together (and also grounded, if the bar 112 is grounded). All components of the MR head 128 coupled to the wires 120 are protected at this time.

TEMPORARY SHORTING MECHANISMS

As alternatives to FIGS. 1–9, the invention also encompasses various temporary shorting mechanisms to temporarily disable an MR head during manufacturing. With these mechanisms, the MR head is activated prior to operation by removing and discarding the temporary shorting mechanisms.

Conductive Finger Shorting

Figure 10:
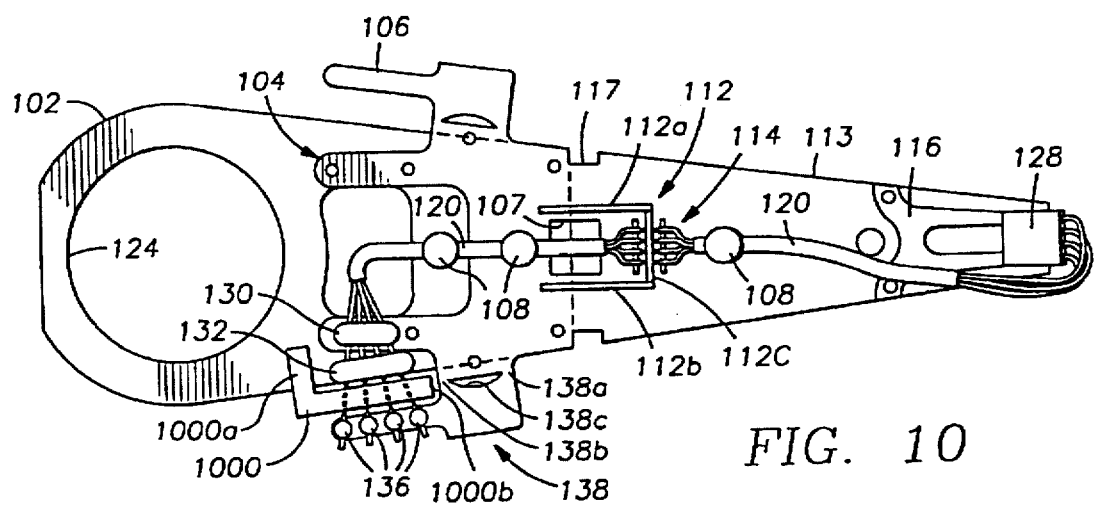
FIG. 10 is a top plan view showing various alternative embodiments of the suspension assembly pursuant to the invention.

With conductive finger shorting (FIG. 10), the wires 120 include uninsulated contact points (not shown) in the span between the extension 104 and the side tab 138. The uninsulated contact points touch a shorting finger 1000, which extends from the arm 102 over the contact points. The wires 120 may be attached to the side tab 138 at predetermined spacings using the adhesive dots 136, as discussed above.

The shorting finger 1000 comprises a metal structure made of stainless steel, or another material similar to the shorting bar 112 discussed above. The finger 1000 includes a base 1000a and a contact member 1000b. In one embodiment (as illustrated) the finger 1000 may comprise an extension of the material of the arm 102. Alternatively, the finger 1000 may comprise an extension of the load beam 113, or a piece separate from load beam 113 and arm 102 where the base is attached to the load beam 113 or arm 120 by welding, glue, or another suitable adhesive device. In either embodiment, the attachment between the base 1000a and the load beam 113 or arm 102 is sufficiently weak to permit a user to cleanly break the finger 1000 therefrom.

The attachment of the finger 1000 to the actuator arm 102 (as illustrated) biases the contact member 1000b toward the contact points of the wires 120. This creates tension at the contact points of the wires 120, as the wires are held in place at two ends by the adhesive dots 136 and spacer 132. When the shorting finger 1000 touches the wires 120, it shorts the wires 120 together. The wires 120 may additionally be grounded, if the shorting finger 1000 is electrically grounded.

After the integrated suspension assembly 199 is installed into the HDA, the MR head 128 is activated by performing the following steps. First, the MR lead wires 120 are connected to a corresponding number of conductors of an interconnect (not shown) leading to an appropriate electrical component such as a disk controller. This step is facilitated by the adhesive dots 136 holding the wires 120 in predetermined spacings, which optimally correspond to the spacing of the cable's conductors. Connection is made on a portion of the wires 120 prior to the adhesive dots 136. Advantageously, the presence of the conductive finger 100 ensures that wires 120 are shorted while they are being connected to the cable.

Next, connection of the wires 120 to the side tab 138 is cut, and the connection between the side tab 138 and the load beam 113 is also broken. The side tab 138 is then removed from the load beam 113. Next, the attachment between the base 1000a and the actuator arm 102 is broken, and the shorting finger 1000 is removed from the actuator arm 102. The above-described order of installation may be changed in a number of respects, however, to suit the application. For example, the shorting finger 1000 may be removed prior to the other steps, if desired. Alternatively, depending upon the particular application, the shorting finger 1000 may even be left in place, if space permits.

Side Tab Shorting

With side tab shorting (FIG. 10), the MR lead wires 120 are conductively adhered to the side tab 138 (as illustrated) or the side tab 106, the side tabs 138, 106 being made from an electrically conductive material. The following description explains side tab shorting using the side tab 138 as an example. The side tab 138 includes points 138a–138b where it attaches to the extension 104 of the load beam 113. The side tab 138 also defines a cutout region 138c between the attachment points 138a–138b, along the boundary between the side tab 138 and the load beam 113. The cutout region 138c ensures that the attachment between the side tab 138 and the load beam 113 is sufficiently weak to permit a user to cleanly break the side tab 138 off from the load beam 113.

The MR lead wires 120 are provided with uninsulated regions (not shown), adhered to the side tab 138 by the adhesive dots 136. In this embodiment, the dots 136 are made of a conductive material such as solder, conductive epoxy, or another appropriate adhesive device. This contact ensures that the components of the MR head 128 attached to the MR lead wires 120 are shorted together (and grounded, if the side tab 138 is electrically grounded). In this state, the MR head 128 is therefore disabled. This contact also ensures that the MR lead wires 120 are rigidly held with a predetermined inter-wire spacing, for convenient alignment and mating to an interconnect (not shown) such as a ribbon cable, flex cable, etc.

After the integrated suspension assembly 199 is installed into the HDA, the MR head 128 is activated by performing the following steps. First, the wires 120 are connected to a corresponding number of conductive elements of an interconnect leading to an appropriate electrical component such as a disk controller. This step is facilitated by the wires 120 being held in their predetermined spacing, which optimally corresponds to the spacing of the interconnect's conductors. Then, the attachment between the side tab 138 and the load beam 113 is broken, and the MR lead wires 120 are disconnected from the side tab 138.

The above-described order of installation may be changed in a number of respects to suit the application. For example, the MR lead wires 120 may be disconnected from the side tab 138 before connecting them to the interconnect.

DRIVE COMPONENTS

Figure 11:
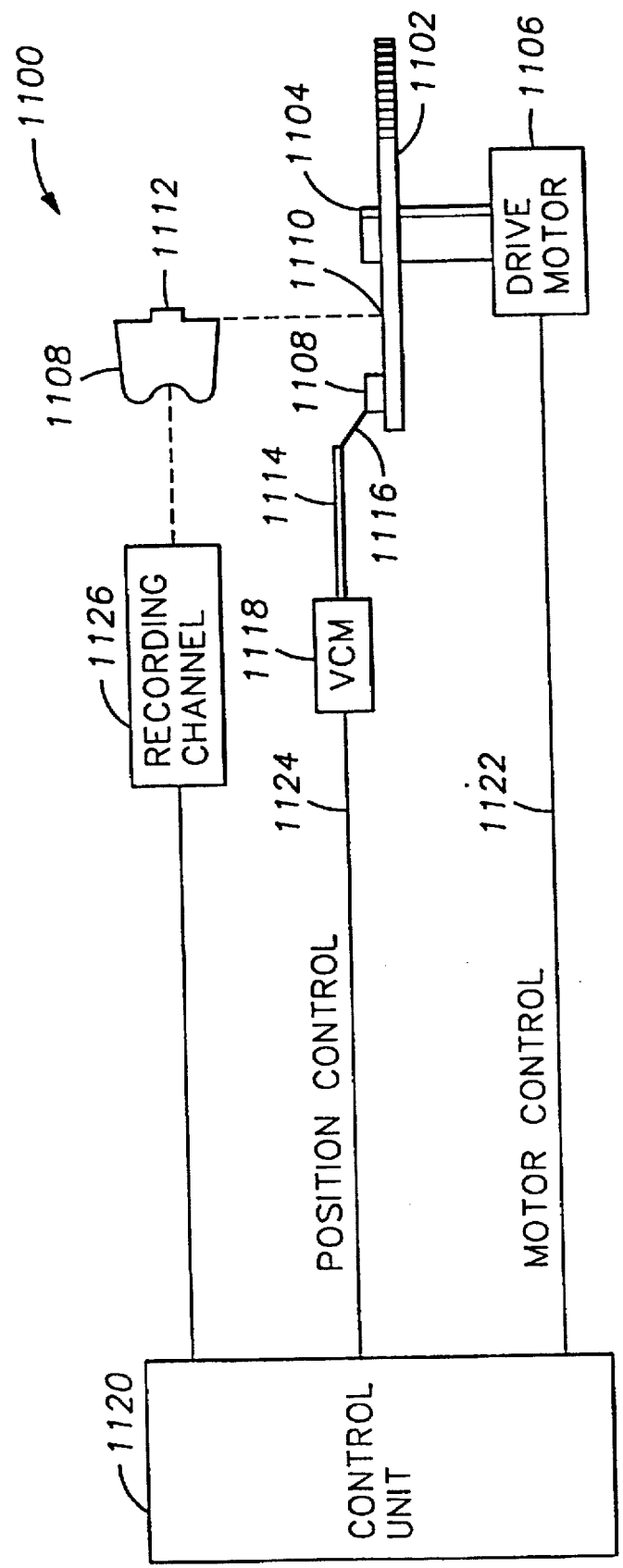
FIG. 11 is a simplified block diagram of a magnetic disk storage system embodying the present invention.

In addition to the invention's automatic and temporary shorting mechanisms, another aspect of the invention concerns a magnetic disk storage system embodying such shorting mechanisms. More particularly, FIG. 11 depicts an exemplary magnetic disk storage system 1106 embodying the invention. Ordinarily skilled artisans will recognize, however, that invention is also applicable to other magnetic recording systems than the specific embodiment 1100 illustrated in FIG. 11.

A magnetic disk storage comprises at least one rotatable magnetic disk 1102 is supported on a spindle 1104 and rotated by a disk drive motor 1106 with at least one slider 1108 positioned on the disk 1102, each slider 1108 supporting one or more magnetic read/write heads. The magnetic recording media on each disk is in the form of an annular pattern of concentric data tracks (not shown) on the disk 1102. As the disk 1102 rotates, the sliders 1108 are moved radially in and out over the disk surface 1110 so that the heads 1112 may access different portions of the disk where desired data is recorded. Each slider 1108 is attached to an actuator arm 1114 by means of a suspension 1116. The suspension 1116 provides a slight spring force which biases the slider 1108 against the disk surface 1110. Preferably, the actuator arm 1114, suspension 1116, and slider 1108 are embodied in an integrated suspension assembly constructed in accordance with the invention, such as ones of the various embodiments described in detail above. Each actuator arm 1114 is attached to an actuator means 1118 The actuator means 1118 as shown in FIG. 1 may be a voice coil motor (VCM), for example. The VCM comprises a coil moveable within a fixed magnetic field, the direction and velocity of the coil movements being controlled by the motor current signals supplied by a controller. During operation of the disk storage system, the rotation of the disk 1102 generates an air bearing between the slider 1108 and the disk surface 1110 which exerts an upward force or lift on the slider. The air bearing thus counterbalances the slight spring force of the suspension 1116 and supports the slider 1108 off and slightly above the disk surface by a small, substantially constant spacing during operation.

The various components of the disk storage system are controlled in operation by control signals generated by control unit 1120, such as access control signals and internal clock signals. Typically, the control unit 1120 comprises logic control circuits, storage means and a microprocessor, for example. The control unit 1120 generates control signals to control various system operations such as drive motor control signals on line 1122 and head position and seek control signals on line 1124. The control signals on line 1124 provide the desired current profiles to optimally move and position a selected slider 1108 to the desired data track on the associated disk 1102. Read and write signals are communicated to and from read/write heads 1112 by means of recording channel 1126.

The above description of a typical magnetic disk storage system, and the accompanying illustration of FIG. 1 are for representation purposes only. It should be apparent that disk storage systems may contain a large number of disks and actuators, and each actuator may support a number of sliders.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. An apparatus for protecting an MR head from electrostatic discharge, comprising:
   an actuator arm for mounting to a head disk assembly;
   a load beam having a distal end and a proximal end, said proximal end being flexibly joined at a joint to the actuator arm to permit the load beam to bend with respect to the actuator arm about the joint;
   a flexible flexure having a distal end and a proximal end, said flexure being mounted to the load beam and extending therealong;
   an MR head mounted to the flexure's distal end, said MR head including MR components;
   a side tab having a projection and a base, said base being attached to the proximal end of the load beam and said projection being spaced apart a predetermined distance from the actuator arm, the side tab extending from the load beam and being substantially coplanar therewith;
   multiple MR lead wires, a number of which are coupled to said MR components, said MR lead wires running from the load beam's distal end along the load beam and the actuator arm to the side tab, said MR lead wires being adhered to a first surface of the side tab at predetermined spacings, and said MR lead wires being uninsulated at contact points positioned between the side tab and the actuator arm; and
   a conductive finger breakably connected to the actuator arm and positioned such that the conductive finger electrically shorts the MR lead wires at their contact points by pressing against the MR lead wires between the side tab and the actuator arm, the conductive finger extending from the actuator arm and being substantially coplanar therewith.

2. The apparatus of claim 1, the conductive finger being breakably connected to the actuator arm through a breakable connection to the load beam.

3. The apparatus of claim 1, the conductive finger being electrically grounded.

4. The apparatus of claim 1, the contact points being adhered to the side tab with glue.

5. The apparatus of claim 1, the side tab being integral with the load beam's proximal end.

6. The apparatus of claim 1, the predetermined spacings being selected to align the MR lead wires for attachment to an interconnect of a predetermined configuration.

7. A method for protecting an MR head from electrostatic discharge, said MR head being provided at an end of a hinged suspension assembly and said MR head having selected MR components coupled to multiple MR lead wires running along the suspension assembly, said method steps comprising:
   electrically shorting the MR lead wires by:
      running the MR lead wires to a side tab attached to an actuator arm of the suspension assembly, the side tab extending from the actuator arm and being substantially coplanar therewith;
      adhering the MR lead wires to the side tab at predetermined spacings;
      providing the MR lead wires with uninsulated contact points;
      providing a conductive finger breakably connected to the actuator arm and extending therefrom to electrically short the MR lead wires at their contact points by pressing against the MR lead wires between the side tab and the actuator arm, the conductive finger extending from the actuator arm and being substantially coplanar therewith;

installing the suspension assembly into a head disk assembly of a disk storage drive;

electrically connecting the MR lead wires to a corresponding number of conductive elements of an interconnect leading to disk drive electronics; and breaking the connection of the conductive finger to the suspension assembly and removing the conductive finger.

8. The method of claim 7, the conductive finger being electrically grounded and the step of electrically shorting the MR lead wires further comprising electrically grounding the MR lead wires.

9. The method of claim 7, the step of adhering the contact points using epoxy.

10. The method of claim 7, further comprising the steps of breaking the attachment between the side tab and the actuator arm and disconnecting the MR lead wires from the side tab.

11. A magnetic storage system, comprising:
a magnetic storage medium having a plurality of tracks for recording data;
an integrated suspension assembly, comprising:
an actuator arm for mounting to a head disk assembly;
a load beam having a distal end and a proximal end, said proximal end being flexibly joined at a joint to the actuator arm to permit the load beam to bend with respect to the actuator arm about the joint;
a flexible flexure having a distal end and a proximal end, said flexure being mounted to the load beam and extending therealong;
an MR head affixed to the flexure's distal end and including MR components, said MR head being maintained in a closely spaced position relative to the magnetic storage medium during relative motion between the MR head and the magnetic storage medium;
a side tab having a projection and a base, said base being attached to the proximal end of the load beam and said projection being spaced apart a predetermined distance from the actuator arm, the side tab extending from the load beam and being substantially coplanar therewith;
multiple MR lead wires, a number of which are coupled to said MR components, said MR lead wires running from the load beam's distal end along the load beam and the actuator arm to the side tab, said MR lead wires being adhered to a first surface of the side tab at predetermined spacings, and said MR lead wires being uninsulated at contact points positioned between the side tab and the actuator arm; and
a conductive finger breakably connected to the actuator arm and positioned such that the conductive finger electrically shorts the MR lead wires at their contact points by pressing against the MR lead wires between the side tab and the actuator arm, the conductive finger extending from the actuator arm and being substantially coplanar therewith.

12. The system of claim 11, the conductive finger being breakably connected to the actuator arm through a breakable connection to the load beam.

13. The system of claim 11, the conductive finger being electrically grounded.

14. The system of claim 11, the contact points being adhered to the side tab with glue.

15. The system of claim 11, the side tab being integral with the load beam's proximal end.

16. The system of claim 11, the predetermined spacings being selected to align the MR lead wires for attachment to an interconnect of a predetermined configuration.

* * * * *